WALL CONSTRUCTION

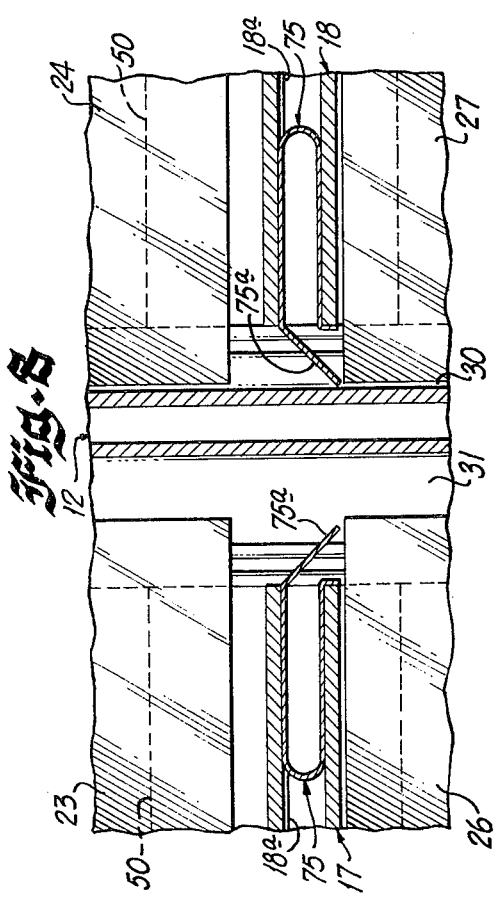
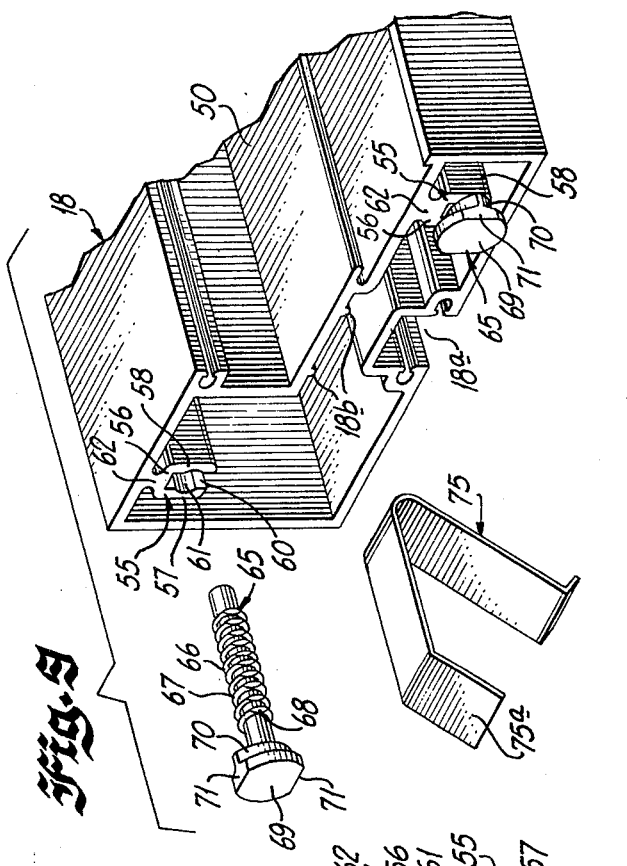
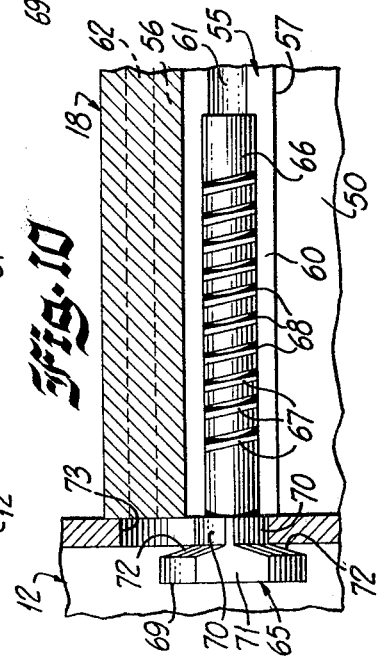
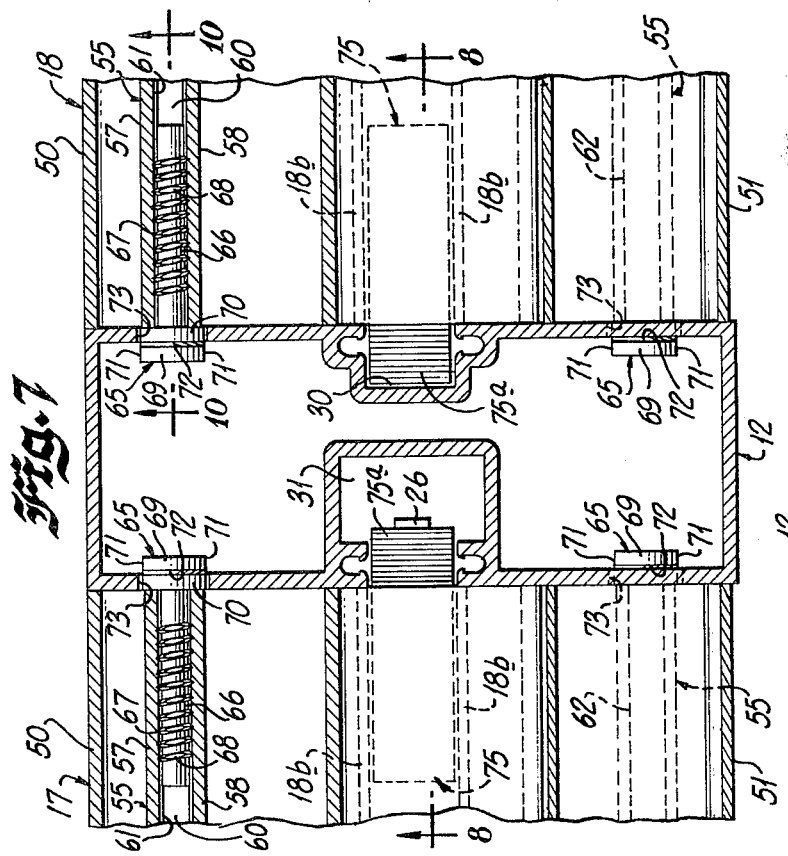

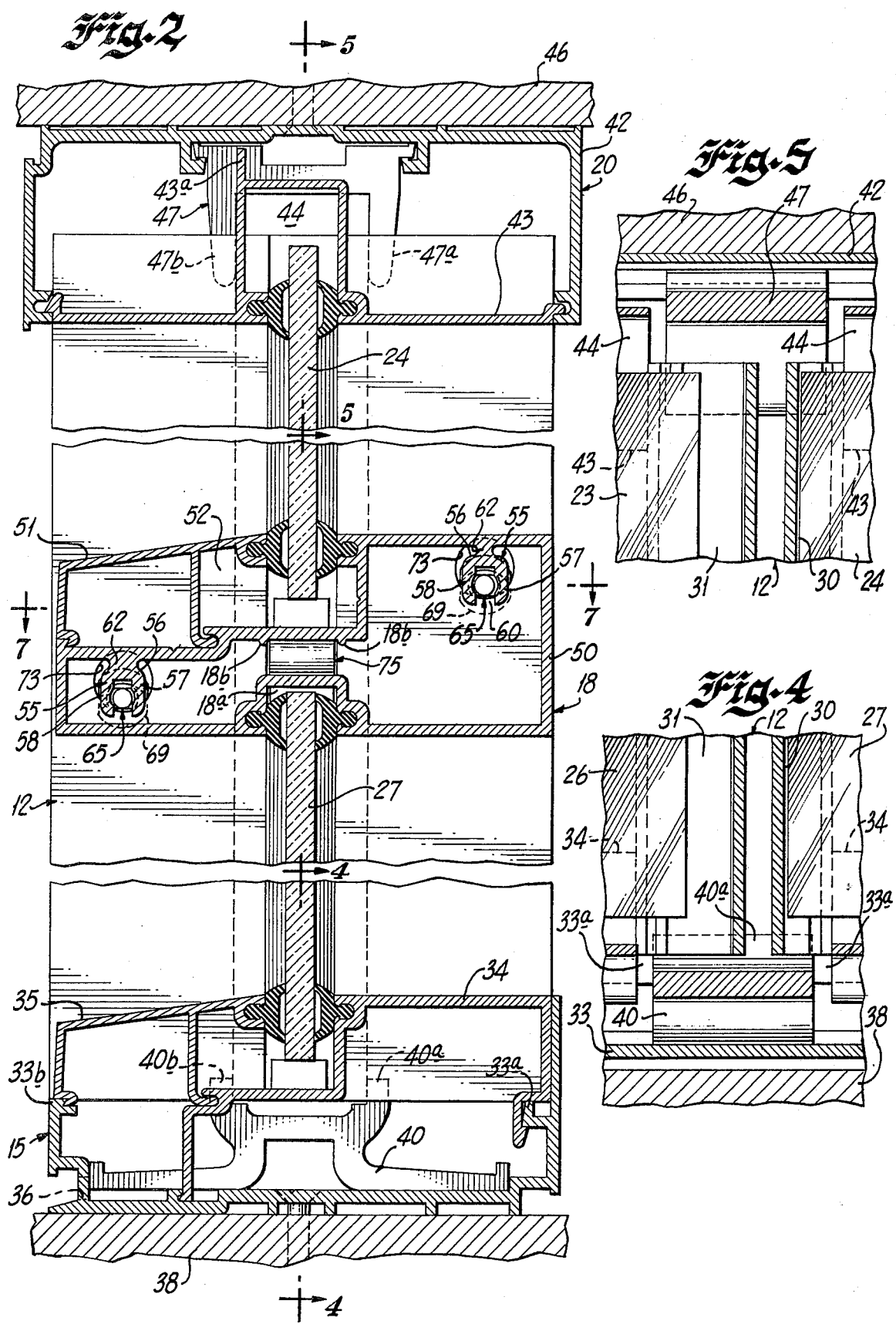

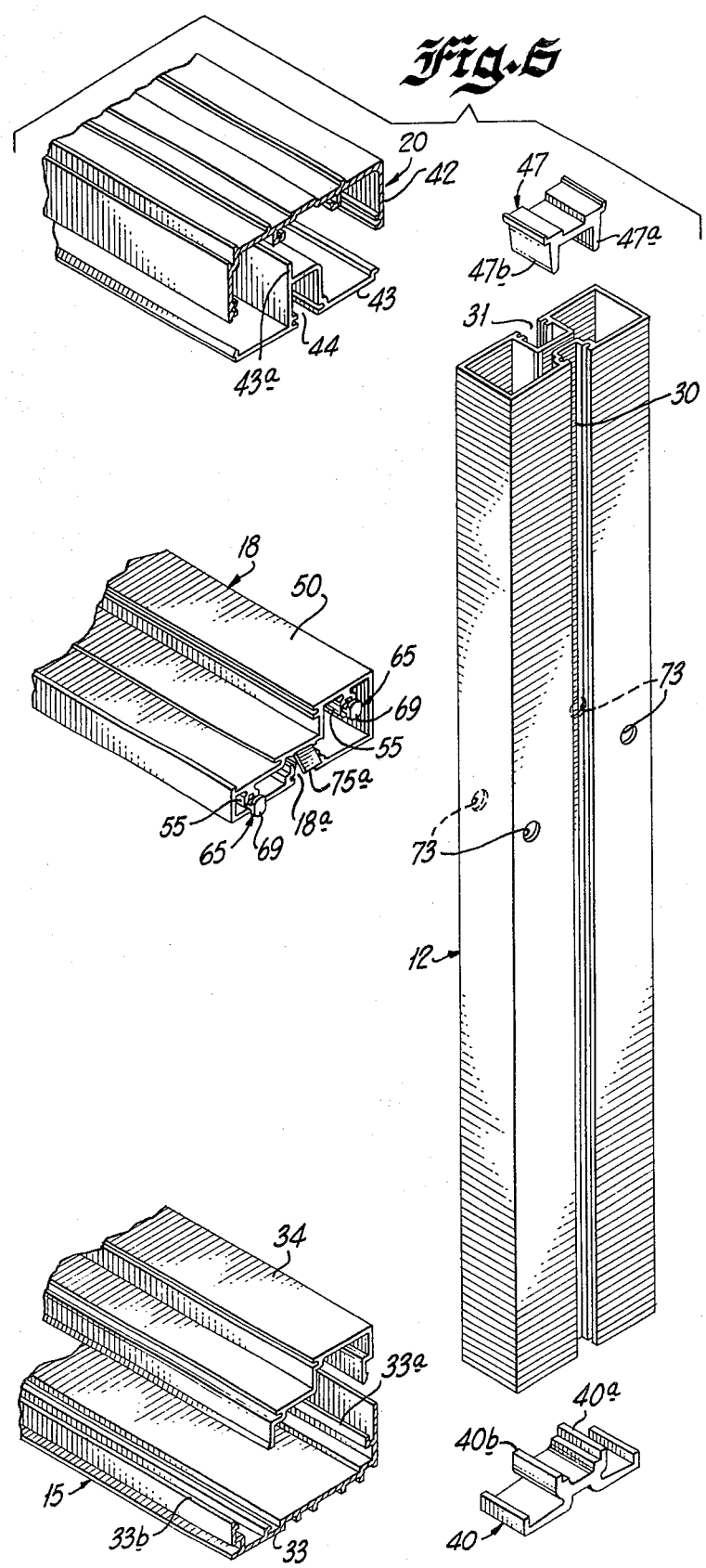
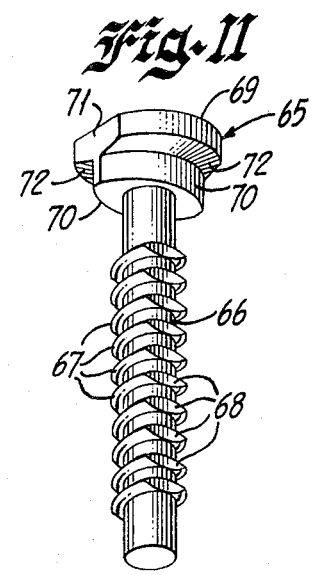
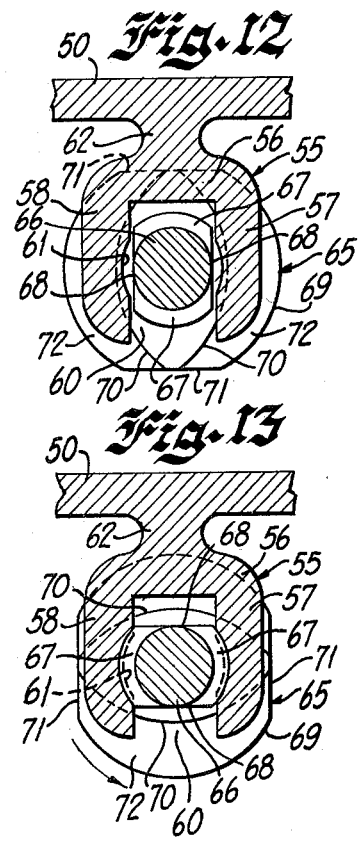

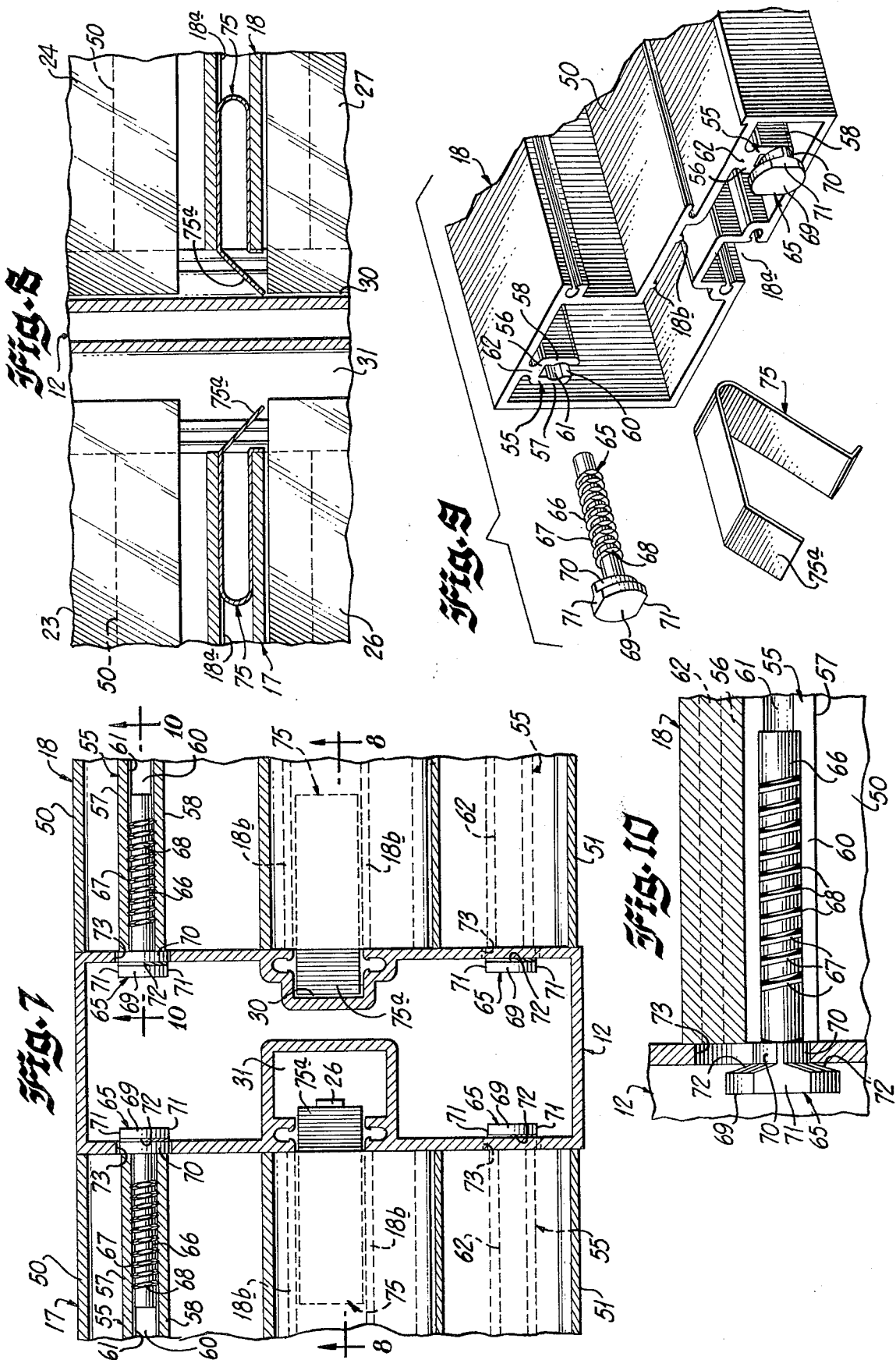

This application is a continuation of copending U.S. patent application Ser. No. 401,460, filed Sept. 27, 1973, now abandoned, which application is a division of application Ser. No. 279,066, filed Aug. 9, 1972, which application Ser. No. 279,066, is a continuation of application Ser. No. 41,951, filed June 1, 1970, now abandoned.

The present invention relates to a new and improved wall construction, and particular, to a new and improved exterior wall construction for building fronts and the like.

Heretofore, building fronts formed of large glass or other panels and supported in a framework of vertical and horizontal mullions fit in distinctly different classes of frame erection. One well known system of frame erection is that known as a shear block system made up of vertical mullions which may be tubular in cross section, to which are secured externally applied shear blocks. The horizontal members in turn are fastened to the shear blocks.

Another method of frame assembly is the screw spline system wherein joints are made economically by driving screws into the continuous extruded screw splines formed integrally with the extruded members. Such a system generally employs open vertical shapes rather than tubes and eliminates the cost of the shear blocks.

Both of the above described methods of frame erection, while possessing certain advantages, also possess certain disadvantages. Accordingly, it would be desirable to provide a dimensional-coordinated program of extruded framing members designed to replace and extend the capabilities of the existing framing systems. Such a framing program should contain members that duplicate in appearance, performance, and erection characteristics that of the existing framing systems. These systems, related to one another by dimensional compatibility and by a large degree of component interchangeability, should be readily combined with one another. Thus, the architect may use whatever method of assembly best suits any particular building project, and to change from one method to the other within a single project. Heretofore such change has not been possible. Moreover, each manufacturer in general has offered only one erection option. There has been no consistency of dimensions between the various products on the market, and even if there were, it would be difficult for an installer to discover and make use of it.

Accordingly, one object of the present invention is to provide a new and improved wall construction which combines the structural efficiency of the tube frame system with the economical erection characteristics of other systems.

Another object of the present invention is the provision of a new and improved wall construction.

Yet another object of the present invention is the provision of a new and improved method of erecting wall framing.

Further objects and advantages of the present invention will become apparent as the following description proceeds and the features of novelty which characterize the invention will be pointed out with particularity in the claims annexed to and forming a part of this specification.

In accordance with these and other objects of the present invention, there is provided an improved wall construction including a vertical mullion and a horizontal member or mullion joined to the vertical mullion. The vertical mullion is first prepared for the attachment of the horizontal member by providing one or more holes for receiving suitable shear pins. In accordance with the present invention, the horizontal member is formed with integrally attached screw splines, and the horizontal mullion is prepared by the insertion of shear pins into the ends of the screw splines. The shear pins in accordance with the present invention are readily installed into the horizontal members by simply pushing them into the screw splines in the horizontal member and giving them a quarter turn. The spiral of the threads draws the shear pins tight against the ends of the horizontal. The horizontal mullion is then installed on the vertical by inserting the heads of the shear pins into the holes previously formed in the vertical mullion, and then tapping the horizontal member downwardly until the shear pins bottom in the holes. The heads of the shear pins are shaped so as both to give firm bearing and to wedge the horizontal members tightly against the vertical mullions. Clearance required to fit the horizontal member with its attached shear pin between the vertical mullions may generally be provided by springing the vertical mullion sideways.

In accordance with another feature of the present invention, there is provided a new and improved shear pin of the thread-cutting type. The shear pin includes a threaded shank portion having segmented thread sections along opposed sides, having the thread sections removed along normal sides thereto to provide opposed flattened side surfaces. The head of the fastener or shear pin includes an arcuate inner bearing section eccentric with the shank, and further includes a seating surface facing toward the shank and tapering outwardly from the shank. The shank may be inserted into a screw spline having opposed noncircular side walls, and will be fully engaged with a quarter turn. Because of the eccentricity of the bearing surface relative to the shank, the shear pin is self-stabilizing under load and will not rotate to loosen or unlock after installation.

For a better understanding of the present invention, reference may be had to the accompanying drawings wherein:

FIG. 2 is a vertical cross sectional view of the wall of FIG. 1, taken along line 2—2 of FIG. 1;

FIG. 4 is a sectional detailed view of the wall of FIG. 1, taken along line 4—4 of FIG. 2;

FIG. 5 is a fragmentary detailed view of a section of the wall of FIG. 1, taken along line 5—5 of FIG. 2;

FIG. 6 is an exploded isometric view of a typical section of the wall of FIG. 1;

FIG. 7 is a horizontal cross sectional view of the wall of FIG. 1, taken along line 7—7 of FIG. 2;

FIG. 8 is a fragmentary cross sectional view illustrating water deflectors in the wall of FIG. 1, taken along line 8—8 of FIG. 7;

FIG. 9 is an exploded end view of a horizontal member assembly according to the present invention;

FIG. 10 is a cross sectional detailed view illustrating a shear pin, and taken along line 10—10 of FIG. 7;

FIG. 11 is a perspective view of a typical shear pin according to the present invention; and FIGS. 12 and 13 are fragmentary end views through a screw spline illustrating the action of the shear pin upon insertion and securement therein.

Figure 1:
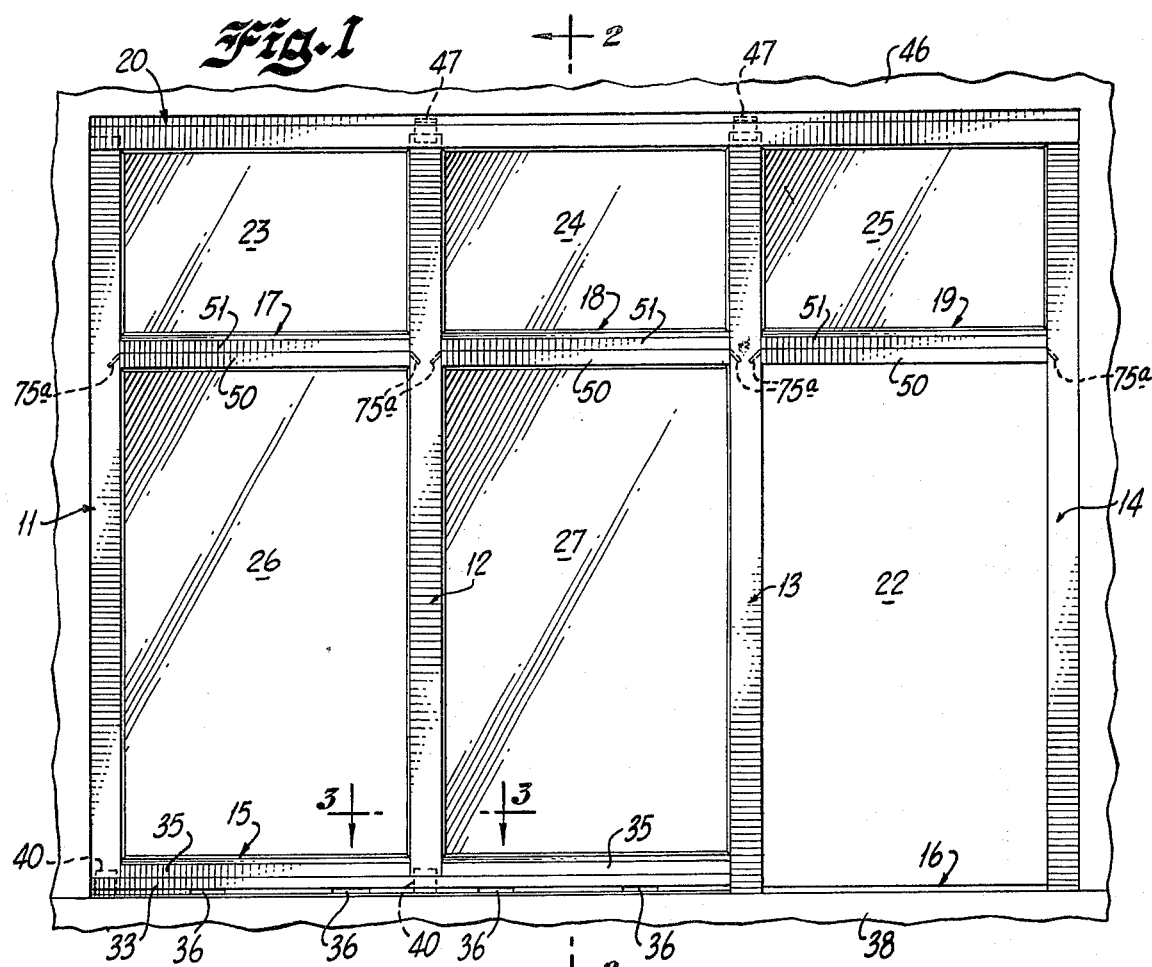
FIG. 1 is an elevational view of a store front or wall construction according to the present invention.

Referring now to the drawings, and particularly to FIG. 1, there is illustrated a typical wall construction formed of a plurality of spaced vertical mullions 11, 12, 13, and 14, a base assembly 15, a threshold 16, a plurality of intermediate horizontal members 17, 18, and 19, and a head assembly 20. As illustrated, the vertical mullions 11, 12, 13, and 14 are through, and the horizontal members 17, 18, and 19 extend therebetween. The interconnecting members form a plurality of openings including a door opening 22, and additional openings of frames for supporting suitable panels such as glass panels 23, 24, 25, 26, and 27.

Figure 3:
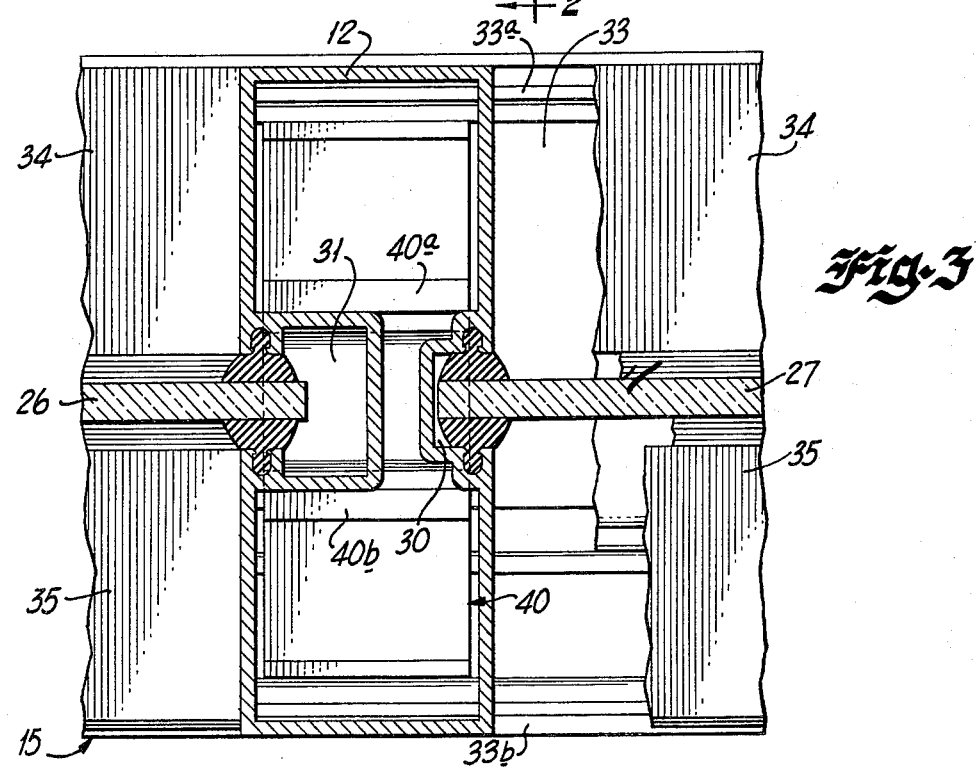
FIG. 3 is a horizontal cross sectional view of the wall of FIG. 1, taken along line 3—3 of FIG. 1.

Referring to FIGS. 2, 3, and 6 a typical vertical mullion 12 may be of tubular form having opposed small and large glass pockets 30 and 31 for receiving the edges of glass or other panels.

The vertical mullions are supported at the bottom from the base assembly 15 which, in the illustrated embodiment, includes a sill 33, a gutter 34 snapped thereto, and a face or glass stop 35. The sill 33 serves as the base flashing for the system and is punched with openings 36, FIG. 2, at suitable intervals for the drainage of infiltrated water. In installation the sill 33 is laid continuously and caulked to the building slab 38. The vertical mullions rest on surfaces 33a, 33b, FIGS. 2 and 6. The gutter 34 is cut to fit between the vertical mullions and then snapped into place, and, when in place, serves to prevent the mullions from moving lengthwise of the sill. The face or glass stop 35 is also cut to fit between the vertical mullions and is, of course, installed after glazing. It is retained between suitable detents. The vertical mullion is prevented from moving in or out with respect to the sill by a clip or shoe 40 resting on the bottom wall of the sill 33 and having upstanding leg portions 40a, 40b closely fitting outside of the glass pockets 30 and 31.

The head assembly 20 used with the present system includes a receptor 42 and a filler 43 snapped together therewith. As best illustrated in FIG. 2, the receptor 42 is dimensioned to be a close fit around the outside of the vertical mullion 12. The filler 43 has the same face dimension as the receptor opening and is provided with a typical glazing pocket 44. The filler 43 is a snap fit into the receptor opening and is held in place by the interfitting portions along its edges. It is prevented from falling through into the receptor by the leg 43a. In installation the receptor is secured continuously to the soffit 46 of the building. The vertical mullions are cut to extend approximately an inch inside the receptor. The fillers are cut to fit between the vertical mullions and are snapped into place as the mullions are installed. The mullions are prevented from moving in or out with respect to the receptor by interference with the receptor itself; in addition, an upper setting chair or clip 47 is inserted into suitable interfitting parts of the receptor 42 and is provided with downwardly extending 47a, 47b fitting around the outside surface of the glass pockets 30 and 31 of the vertical mullion to permit dimensional tolerances and to accommodate vertical expansion and contraction of the mullion.

In accordance with the present invention, there is provided an improved arrangement for joining the horizontal members or mullions to the vertical mullions.

The horizontal members, such as member 18, is formed of two pieces including a tubular section 50 and a face or glass stop 51 which snaps to the tubular section 50 in interlocking position forming a glass pocket 52. It is appreciated that the glass stop 51 is assembled after the glazing panel is in place. The tubular section 50 may suitable be formed of extruded material, such as aluminum, and has formed therewith one or more screw splines 55 extruded integrally therewith. Each of the screw splines 55 is of general U-shape in cross section and includes a bight portion 56, FIGS. 12 and 13, and side leg portions 57, 58 defining opposed side walls forming a screw receiving channel 60. The screw receiving channel is noncircular in cross section; however, in the illustrated embodiment the inner opposed side walls are formed with longitudinal, concentric, arcuate confronting recesses adapted for receiving a self-threading screw pin. An extruded neck portion 62 integrally joins the screw spline 55 to a wall portion of the tubular section 50.

In accordance with another aspect of the present invention, there is provided an improved screw shear pin 65 best illustrated in FIGS. 11, 12, and 13. As therein illustrated, the shear pin 65 includes a threaded shank portion 66 having segmented thread sections 67 along opposed sides, with the thread sections removed along sides normal thereto to provide parallel flattened sides 68. Accordingly, a plurality of self-tapping cutting edges are formed of the leading edge of each of the segmented thread sections at the flattend sides 68 thereof. Each shear pin 65 additionally includes a head portion 69 having a pair of opposed arcuate inner bearing sections 70 for seating on the side wall of a vertical mullion and eccentrically formed with respect to the shank portion. The head portion additionally includes an enlarged head 71 having a seating surface 72 facing the shank portion and tapering outwardly from the shank thereof, best illustrated in FIG. 10.

The shear pin 65 may be readily assembled in a screw spline 55 by the mere insertion of the shear pin with the flattened sides 68 thereof parallel to the side leg portions 57 and 58 of the screw splines, as illustrated in FIG. 12, and given a quarter turn to the position illustrated in FIG. 13. The lead of the threads 67 will draw the shear pin 65 up tight against the end of the horizontal member.

To provide for the assembly of the horizontal member with the vertical mullions, the vertical mullions are first prepared for the attachment of the horizontal by drilling suitable holes 73 for receiving the head 71 of the shear pin 65. The holes 73 are sufficiently large to permit insertion of the head 71, and desirably have the same radius as the radius of the arcuate bearing section 70 thereby to provide a good bearing surface after assembly. The horizontal member is installed on the vertical by inserting the heads 71 of the shear pins 65 into the holes 73 and then tapping the horizontal members downwardly until the shear pins 65 bottom in the holes. Thus, the shear pins give firm bearing, and additionally the tapered seating surface 72 is effective to wedge the horizontal tightly against the vertical.

To prevent water from flowing along the inner surface of the horizontal members, and to direct any water which may have infiltrated into the vertical glazing channels 30 and 31, wherein they may be directed out of the building through the weep holes 36, there are provided suitable water deflectors 75. As best shown in FIGS. 8 and 9, the water deflector 75 has a general U-shaped portion formed of spring material terminating in a downwardly extended water deflector portion 75a, and proportioned to snap fit between the bight portion of a glazing channel 18a and downwardly projecting ribs 18b, FIG. 9. Thus, the water deflector 75 may readily be snapped into the end of the horizontal members prior to their assembly with the verticals. Suitable caulking may be provided between the water deflector 75 and the horizontal member 18.

It will be seen that the shear pin system herein described in detail combines the structural efficiency of the tube frame systems with the speed of erection of other systems. Moreover, the shear pin system is readily interchangeable with the shear block system and the screw spline systems previously described. The shear pin system advantageously uses continuous base and head connector members, between which the vertical mullions are installed, one at a time. Moreover, neither the base nor the head receptor requires special fabrication to accept the mullions.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A wall construction including a through vertical mullion of one piece continuous tubular transverse cross-section having a pair of spaced apart opposite side walls with a glazing recess in at least one of said side walls and a horizontal member in end abutting relation against said one of said side walls, said horizontal member having a pair of longitudinally extending screw splines disposed on opposite sides of a glazing recess aligned with the recess in said side wall for receiving an edge portion of a wall panel, a pair of shear pin fasteners each having a threaded shank threaded into the end of one of the screw splines and having a head portion projecting laterally of said shank and spaced from said end of its respective screw spline, said fasteners each including an arcuate bearing portion between said head portion and shank providing the spacing between said head portion and the end of said horizontal member, said vertical mullion having spaced apart circular holes in said one side wall for receiving said head portions of said fasteners inserted through said holes until inside of said one side wall within said tubular cross-section with said arcuate bearing portions bottomed against lower portions of wall edges defined by said holes with said head portion bearing against the inside surface of said one side wall to secure said horizontal member together with said vertical mullion with adequate bearing support for said horizontal member.

2. The wall constructions of claim 1 wherein said arcuate bearing portions include bearing members eccentric of their shanks having radii substantially equal to the radii of said shear pin receiving circular openings in said one side wall of said vertical mullion for bearing engagement.

3. A wall construction as set forth in claim 2 wherein said screw splines are integrally formed extrusions of said horizontal member, said screw splines being formed with a generally U-shaped transverse cross section having a bight portion and leg portions defining opposed side walls, said opposed side walls having longitudinally extending, concentric arcuate confronting recesses adapted for receiving the shank of one of said shear pin fasteners, said shear pin fasteners including a threaded shank formed with segmented thread sections along a first pair of opposed sides and having thread sections removed along a second pair of sides normal to said first pair to provide flattened sides, said shanks of said shear pin fasteners inserted longitudinally into said screw splines with flattened sides confronting between said opposed side walls of said leg portions, and turned a quarter of a turn about the longitudinal axis of said shanks locking said segmented thread sections into said leg portions and drawing said fastener head portions tightly against the end of said horizontal member.

4. The wall construction as set forth in claim 1 wherein the head portions of said shear pin fasteners include a tapered wedging sloping toward said shank, and wherein the arcuate bearing portion has a thickness longitudinally of said fastener less than the thickness of said one side wall, whereby seating of said arcuate bearing portions against the lower portions of the surface defined by circular openings provides a wedge fit between the end of said horizontal member and said wedging surface of said fasteners.

5. A wall construction as set forth in claim 4 wherein said vertical mullion and said horizontal member are formed of aluminum, and said shear pin fasteners are formed of steel.

* * * * *